US006954813B2

(12) United States Patent
Holley, III et al.

(10) Patent No.: US 6,954,813 B2
(45) Date of Patent: Oct. 11, 2005

(54) METHOD, SYSTEM AND PROGRAM PRODUCT FOR FACILITATING HOTPLUGGING OF MULTIPLE ADAPTERS INTO A SYSTEM BUS AND TRANSPARENTLY OPTIMIZING CONFIGURATION OF THE SYSTEM BUS

(75) Inventors: Edward R. Holley, III, Kirkland, WA (US); Koichi Kii, Bellevue, WA (US); Ryuji Orita, Kirkland, WA (US); Christopher C. Ruggles, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/323,475

(22) Filed: Dec. 18, 2002

(65) Prior Publication Data

US 2004/0123009 A1 Jun. 24, 2004

(51) Int. Cl.[7] ............................................. G06F 13/00
(52) U.S. Cl. ........................................ 710/302; 710/60
(58) Field of Search ................................. 710/302, 301, 710/33, 60

(56) References Cited

U.S. PATENT DOCUMENTS

| 5,815,734 | A | * | 9/1998 | Lee et al. ..................... 710/60 |
| 6,070,207 | A | * | 5/2000 | Bell ............................ 710/302 |
| 6,182,173 | B1 | * | 1/2001 | Grosser et al. ............. 710/302 |
| 6,185,692 | B1 | * | 2/2001 | Wolford ....................... 713/501 |
| 6,772,263 | B1 | * | 8/2004 | Arramreddy ................ 710/302 |
| 6,782,438 | B1 | * | 8/2004 | Duncan et al. ............. 710/104 |

OTHER PUBLICATIONS

PCI Local Bus Specification, Revision 2.2, Dec. 18, 1998, pp. 146–152.*
PCI Special Interest Group publication, entitled: "PCI–X Addendum to the PCI Local Bus Specification", Revision 1.0, Sep. 22, 1999, pp. 1–222.
U.S. Patent Application by Atherton et al., "System and Method For Identifying One Or More Optimum Configurations Of A Data Processing System", U.S. Appl. No. 09/918,330, Filed Jul. 30, 2001.

* cited by examiner

*Primary Examiner*—Tim Vo
*Assistant Examiner*—Trisha Vu
(74) *Attorney, Agent, or Firm*—Abdy Raissinia, Esq.; Kevin P. Radigan, Esq.; Heslin Rothenberg Farley & Mesiti, P.C.

(57) ABSTRACT

A facility is provided for hotplugging multiple adapters into a system having a bus with a plurality of adapter receiving hotplug slots. The facility includes connecting multiple hotplug adapters to multiple hotplug slots of the bus, and automatically determining a bus speed for the bus that the multiple hotplug slots and the multiple hotplug adapters connected thereto support. The automatically determining is transparent to a user of the system making the hotplug adapter connections and is independent of an order of connection of the multiple hotplug adapters to the multiple hotplug slots.

27 Claims, 2 Drawing Sheets

METHOD, SYSTEM AND PROGRAM PRODUCT FOR FACILITATING HOTPLUGGING OF MULTIPLE ADAPTERS INTO A SYSTEM BUS AND TRANSPARENTLY OPTIMIZING CONFIGURATION OF THE SYSTEM BUS

BACKGROUND OF THE INVENTION

1. Technical Field

The present invention relates, in general, to computing or processing systems, and more particularly, to the dynamic configuration or reconfiguration of such a system. Still more particularly, the present invention relates to methods, systems and program products for facilitating hotplugging of multiple adapters into a system having at least one bus with multiple hotplug slots, and to the transparent obtaining of an optimum bus speed responsive to, and independent of an order of, connection of the multiple hotplug adapters to the multiple hotplug slots.

2. Description of Related Art

The peripheral component interconnect (PCI) specification introduced by Intel Corporation defines a high-performance local bus architecture that supports installation of PCI-compliant expansion cards. The PCI standard has evolved over a period of years to support a wide assortment of system and hardware component capabilities. As used herein, "hardware components" can mean any part of a processing system and may include data storage devices, communication devices, etc. "Hardware adapters" are, for example, hardware components implemented on an adapter card installed on an expansion slot. Hardware adapters can usually be easily moved or replaced while other hardware components may be permanently coupled (e.g., soldered) to the processing system.

Whereas the original PCI bus standard, herein referred to as "conventional mode", limits bus clock frequency either to 33 MHz or 66 MHz, newer PCI-X hardware adapters, operating in "PCI-X mode", are today capable of bus communication at 66 MHz, 100 MHz or 133 MHz. Available PCI-compatible hardware adapters support either 32-bit wide and 64-bit wide versions of the PCI bus and operate at a variety of supply voltages (e.g., 3.3V and 5V). Future expansions and revisions of the PCI architecture may include higher supported clock speeds, wider buses, or double-data rate modes of operation, which will result in an even wider array of possible system configurations.

Despite the wide array of implementations, compatibility has been maintained between devices implementing different PCI bus versions. For example, PCI buses are programmed to operate at the fastest common speed or mode that all hardware components on the bus can support. Hardware components restrict their speed or mode in the presence of buses or hardware components that are not capable of faster operation. In general, hardware components having different characteristics that are coupled to the same PCI bus will function properly, but the performance of the faster hardware components will be degraded due to the lower bus frequency dictated by the slower hardware components. "System performance" or "performance" can be measured, for example, as the throughput of a processing system or the total number of users the processing system can currently support.

The performance of hardware devices on the PCI buses within a system can be a significant factor in the overall performance of the system. Accordingly, the present invention recognizes that configurations that prevent devices from operating at their maximum capability should be avoided. For example, with conventional hotplug approaches, careless ordering of placement of hotplug adapters on a bus can result in significant performance degradation. The processing system may continue to function despite the less-than-optimum hardware component configuration, so problems with the configuration may only be evident during special circumstances (e.g., intervals of peak demand of the processing system resources).

Consequently, since system administrators and other computer users are typically not experts on PCI bus specification, there is a growing demand for a facility for hotplugging multiple adapters onto one or more buses of a system and transparently obtaining an optimum configuration for each bus responsive to, and independent of an order of, the addition of hotplug adapters.

BRIEF SUMMARY OF THE INVENTION

The shortcomings of the prior art are overcome and additional advantages are provided through the provision of a method for hotplugging multiple adapters into a system having a bus with a plurality of adapter receiving hotplug slots. The method includes: connecting multiple hotplug adapters to multiple hotplug slots of the bus of the system; and automatically determining a bus speed for the bus that the multiple hotplug slots and the multiple hotplug adapters connected thereto support, wherein the automatically determining is transparent to a user of the system making the hotplug adapter connections and is independent of an order of connection of the hotplug adapters to the multiple hotplug slots.

In a further aspect, a method is provided for adapter hotplugging into a system having a bus with multiple adapter receiving hotplug slots, each having an associated hotplug latch. This method includes: detecting at least one hotplug latch event indicative of hotplug addition of at least one adapter to the bus; determining whether another adapter is currently connected to the bus, and if not, determining whether there are any open hotplug latches on the bus; and waiting for a next hotplug latch event if there is any open hotplug latch on the bus, otherwise automatically setting a bus speed for the bus that the multiple hotplug slots and any adapters connected thereto support.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

DETAILED DESCRIPTION OF THE INVENTION

Overview

Figure 2:
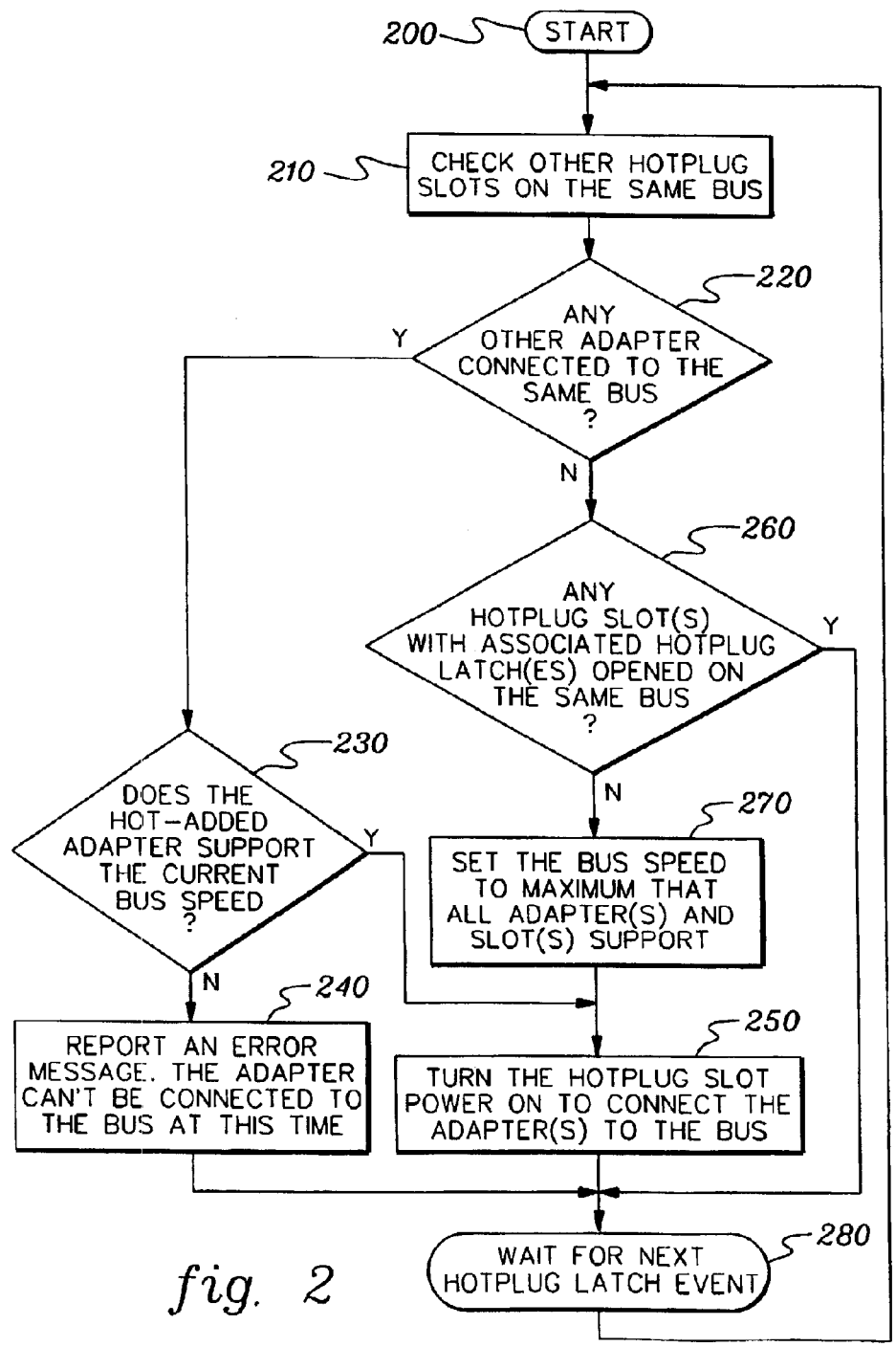
FIG. 2 depicts a flowchart of one embodiment of processing for automatically setting bus speed for a bus having at least one adapter being hotplug connected thereto, in accordance with an aspect of the present invention.

Generally stated, provided herein is a hotplug control facility for optimizing hotplugging of multiple adapters into a system having a bus with a plurality of adapter receiving hotplug slots. The facility, one functional embodiment of which is depicted in FIG. 2, is (in one embodiment) responsive to connection of multiple hotplug adapters to multiple hotplug slots of a system bus. The facility automatically determines bus speed for the bus that the multiple hotplug slots and the multiple hotplug adapters connected thereto support. This determination occurs transparent to a user of the system making the hotplug adapter connections and is independent of an order of connection of the multiple hotplug adapters to the multiple hotplug slots.

More particularly, an adapter hotplugging facility is provided herein which includes detecting occurrence of a hotplug latch event indicative of hotplug addition of an adapter to a bus of the system. Responsive thereto, determining whether another adapter is currently connected to the bus, and if not, determining whether there are any open hotplug latches on the bus. If so, then processing waits for a next hotplug latch event to occur. Otherwise, processing automatically sets a bus speed for the bus to, for example, a maximum that the multiple hotplug slots and adapters connected thereto support.

Detailed Description

One example of a processing system which can employ a facility in accordance with an aspect of the present invention would be International Business Machines (IBM) Corporation's eServer xSeries 360 system. This system has at least two PCI buses, labeled bus B & bus C herein, which support bus speeds as follows:

TABLE 1

| Slot | Bus | Supported Bus Speed (MHz) | | | | |
|---|---|---|---|---|---|---|
| 1 | B | PCI-X133 | PCI-X100 | PCI-X66 | PCI-66 | PCI-33 |
| 2 | B | — | PCI-X100 | PCI-X66 | PCI-66 | PCI-33 |
| 3 | C | — | — | PCI-X66 | PCI-66 | PCI-33 |
| 4 | C | — | — | PCI-X66 | PCI-66 | PCI-33 |
| 5 | C | — | — | PCI-X66 | — | PCI-33 |
| 6 | C | — | — | PCI-X66 | — | PCI-33 |

As described in the PCI-X specification (see the PCI Special Interest Group publication entitled: "PCI-X Addendum to the PCI Local Bus Specification—revision 1.0" (Sep. 22, 1999), the entirety of which is hereby incorporated herein by reference), if a PCI-X133 MHz adapter and a PCI 33 MHz adapter are installed on the same bus, the bus must operated in PCI 33 MHz. Since bus speed must be set to the slowest adapter's speed, a user should avoid mixing faster adapters and slower adapters on the same bus. In order to assist users in determining the best configuration, a PCI manager can be provided to facilitate a user's static optimization of a PCI/PCI-X configuration. The PCI manager may suggest to a user to move one or more adapters between buses. An implementation of a PCI manager is described in co-pending, commonly assigned U.S. patent application Ser. No. 09/918,330, entitled "System and Method For Identifying One or More Optimum Configurations of A Data Processing System", the entirety of which is hereby incorporated herein by reference. Although providing a user with a PCI manager, this co-pending patent application does not operate in or describe a hotplugging environment.

The above-referenced PCI-X Addendum describes compatibility and system initialization, as well as system interoperability requirements. The document defines two frequency ranges of PCI-X adapters or devices, namely, PCI-X 66 MHz and PCI-X 133 MHz. Both types of devices have identical requirements except for electrical differences specified in section 9 of the Addendum, such as the minimum clock period (maximum clock frequency), and the add-in card identification requirements. PCI-X 66 MHz devices operate in PCI-X mode with clock frequencies from 50 MHz to 66 MHz. PCI-X 133 MHz devices operate in PCI-X mode with clock frequencies from 50 MHz to 133 MHz. If only PCI-X 133 MHz devices are installed on a bus, the bus operates in PCI-X mode and the clock operates up to 133 MHz. If all devices on a bus are PCI-X 133 MHz and PCI-X 66 MHz, the bus operates in PCI-X mode and the clock operates up to 66 MHz. All PCI-X devices and systems also support conventional PCI 33 MHz mode. They optionally support conventional PCI 66 MHz mode.

If a bus includes at least one 33 MHz conventional device, the bus must operate in conventional 33 MHz mode. If only conventional 66 MHz devices are present in slots on the bus, a PCI bus optionally operates in either conventional 66 MHz mode or conventional 33 MHz mode. If a bus includes only PCI-X devices, the bus operates in PCI-X mode. If the bus includes at least one PCI-X 66 MHz device, the maximum clock frequency is 66 MHz. If the bus contains only PCI-X 133 MHz devices, then the maximum clock frequency is 133 MHz. PCI-X systems are permitted to limit bus frequency to a value lower than the nominal down to the minimum specified in section 9 of the PCI-X Addendum referenced above. This is generally done to support higher loading on the bus. For example, a bus with two expansion slots would typically operate at 100 MHz.

Table 2 depicts a typical example for three adapter slots on a same bus.

TABLE 2

| Slots Supported in 33 MHz Conventional Mode | Slots Supported in 66 MHz Conventional Mode | Slots Supported in 66 MHz PCI-X Mode | Slots Supported in 100 MHz PCI-X Mode | Slots Supported in 133 MHz PCI-X Mode |
|---|---|---|---|---|
| 3 | 2 | 3 | 2 | 1 |

With this configuration, the bus can operate either one 133 MHz PCI-X adapter in 133 MHz, or two 133 MHz PCI-X adapters in 100 MHz. Returning to IBM's xSeries 360 system referenced above, the system's bus B operates at 133 MHz if there is a PCI-X 133 MHz adapter in slot 1 and there is no adapter in slot 2 (see Table 1). The bus operates at 100 MHz if a PCI-X 133 MHz adapter is populated in slot 2 as well. The system changes the bus speed only when there is no adapter connected to the bus. In other words, the system's controller changes the bus speed before connecting an adapter to the bus. The controller connects the adapter to the bus without changing the bus speed if there is another adapter already running on the same bus. In the case where the adapter does not support the current bus speed, the connection request is refused (i.e., a bus speed mismatch error is generated).

The following shows how xSeries 360 system's bus B speed is changed.
A) The bus B operates at 133 MHz.
1. Bus B is empty (there is no adapter on the bus).
2. Open the slot 1 latch.
3. Add the 133 MHz adapter in the slot 1.

4. Close the slot 1 latch.

The hotplug software sets the bus speed to 133 MHz (maximum speed that is supported by both slot 1 and the adapter) and connects the adapter to the bus. Hot-adding an adapter in slot 2 will be refused, because the bus speed can't be changed as long as there is the adapter in slot 1.

B) The bus B operates at 100 MHz.
1. Bus B is empty (there is no adapter on the bus).
2. Open the slot 2 latch.
3. Add the 133 MHz adapter in the slot 2.
4. Close the slot 2 latch.

The hotplug software sets the bus speed to 100 MHz (maximum speed that is supported by both slot 2 and the adapter) and connects the adapter to the bus. Slot 1 can accept another 133 MHz adapter.

5. Open the slot 1 latch.
6. Add another 133 MHz adapter in slot 1.
7. Close the slot 1 latch.

The hotplug controller connects the adapter to the bus without changing the bus speed. Two 133 MHz adapters thus run at 100 MHz.

The hotplug facility disclosed herein adds another way to change the bus speed. One advantage to this new facility is that it is independent of where the first adapter is hot-added.

C) New way for the bus B to operate at 100 MHz.
1. Bus B is empty (there is no adapter on the bus).
2. Open the slot 1 latch and the slot 2 latch.
3. Add an adapter in the slot 1.
4. Close the slot 1 latch.

The adapter is not connected to the bus. The hotplug controller ignores this event because there is another slot that the latch is still open (see FIG. 2 and the discussion thereof below).

5. Add another adapter in the slot 2.
6. Close the slot 2 latch.

The hotplug controller detects that all latches of bus B are closed. It therefore sets the bus speed to 100 MHz (maximum speed that is supported by all slots and all adapters on the bus). Those skilled in the art will note that the control facility disclosed herein can be implemented in software (or firmware), and does not require any change to current user interfaces. Also, the legacy operations A) and B) above still work as before.

Returning to IBM's xSeries 360 system, if there are many hotplug slots on a single bus (for example, 4 slots share one bus) and the adapters' maximum speed are not the same, deciding the order of adapters/slots is conventionally important. With the legacy operations A) & B), the slowest adapter must be hot-added first to the empty bus, otherwise the next adapter may be slower than the current bus speed and cause a bus speed mismatch error.

For example, the correct steps for hot-adding two PCI-X 133 MHz devices, one PCI-X 66 MHz device, and one PCI 66 MHz device on an xSeries 360 Bus C (see Table 3) are as below.

TABLE 3

| Slot | Bus | Supported Bus Speed (MHz) | | | | |
|---|---|---|---|---|---|---|
| 3 | C | — | — | PCI-X66 | PCI-66 | PCI-33 |
| 4 | C | — | — | PCI-X66 | PCI-66 | PCI-33 |
| 5 | C | — | — | PCI-X66 | — | PCI-33 |
| 6 | C | — | — | PCI-X66 | — | PCI-33 |

Steps:
1. Add the PCI 66 MHz into slot 5 or slot 6.

The bus speed is changed to PCI 33 MHz. (If the PCI 66 MHz adapter is hot-added into slot 3 or slot 4, the bus speed is changed to 66 MHz, then slot 5 or slot 6 does not accept any adapters).

2. Add other adapters into any other slots.

PCI 33 MHz is supported by any adapters, so the bus speed mismatch error does not occur.

If the user makes a mistake at the first step, the user gets the bus speed mismatch error eventually. However, using a hotplug facility in accordance with the present invention, the user simply opens all latches, adds the adapters to any slots, closes all latches, and the controller automatically sets the bus speed to 33 MHz so that all adapters work.

Note that the hotplug solution presented herein does not require the user to specify which bus speed is preferred. The bus speed is transparently determined without user input.

Figure 1:
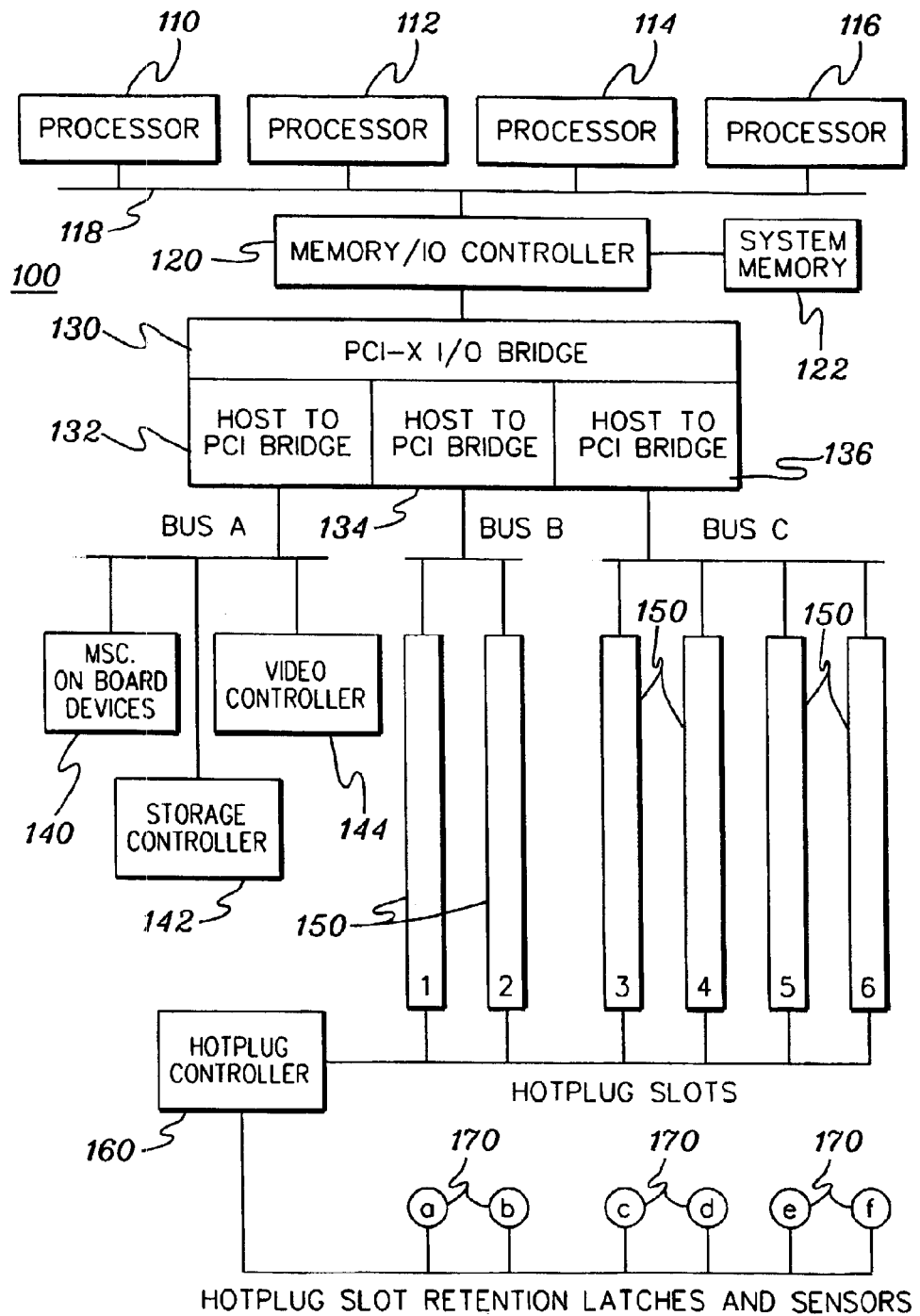
FIG. 1 is a block diagram of one embodiment of a processing system to employ an adapter hotplug control facility, in accordance with an aspect of the present invention.

FIG. 1 depicts one embodiment of a computing or processing system, generally denoted 100, to employ a hotplug control facility in accordance with an aspect of the present invention. System 100 includes one or more system processors 110, 112, 114, 116 . . . , and a memory/(I/O) controller 120. Controller 120 controls the writing and reading of data to/from, for example, system memory 122. System memory 122, coupled to memory/(I/O) controller 120 provides storage for software and data, and may include both read-only memory (ROM) and random access memory (RAM), for example. Memory/(I/O) controller 120 connects the host processors (110, 112, 114, 116 . . . ) to a PCI-X I/O bridge 130, which is one example of a host bridge, coupling the host processors to system buses, herein labeled bus A, bus B & bus C, via bridges 132, 134 & 136, respectively.

Buses A, B & C in this example comprise primary PCI buses. Bus A couples on-board devices to the processors and runs, for example, at 33 MHz. For example, bus A may be connected to miscellaneous on-board devices 140, to a storage controller 142 and to a video controller 144, as well as to other devices known to those skilled in the art.

Bus B and bus C each have multiple adapter slots 150 for connecting external devices to the system. Bus B is shown to have two slots, also referred to herein as hotplug slots 150 (labeled 1 & 2) for receiving hotplug adapters. Bus C is shown to contain four hotplug slots 150 (labeled 3, 4, 5 & 6), again for receiving hotplug adapters as described herein. Once an adapter is inserted into a respective slot and powered, the adapter becomes an integral part of processing system 100, and is controllable by system processors 110, 112, 114 & 116 by relaying PCI bus transactions along the paths formed by the adapter slots, PCI-X I/O bridge and memory/(I/O) controller. In alternate embodiments, PCI-to-PCI bridges (not shown) may be employed to couple the adapter slots to a primary PCI bus, such as bus B or bus C. The system configuration depicted in FIG. 1 is presented by way of example only. Other system configurations are also possible and included within the scope of the claims presented herewith.

A hotplug controller 160 controls the setting of bus speed for bus B and bus C dependent, in part, upon the hotplug adapters connected thereto. As one example, hotplug controller 160 can implement a hotplug control facility in accordance with an aspect of the present invention. As noted above, this facility might be implemented in software or firmware within the controller or external to the controller as desired. Each hotplug slot 150 has a corresponding hotplug latch and sensor 170 associated therewith (labeled a, b, c, d, e & f). The sensors 170 inform hotplug controller 160 whether the associated latch is open or closed.

FIG. 2 depicts one embodiment of processing implemented in accordance with an aspect of the present invention. This hotplug control processing starts when a hotplug latch event is received 200. Processing initially checks other hotplug slots on the same bus 210 to determine whether any other adapter is connected to and powered on by the same bus 220. If "yes", then a determination is made whether the recently hot-added adapter is supported by the current bus speed 230. If "no", an error message is reported since the adapter can't be connected to the bus at this time 240. If the currently hot-added adapter is supported by the current bus speed, then the hot-plug slot power for the newly connected adapter is turned on to connect the adapter to the bus 250, after which processing waits for the next hotplug latch event 280 before returning to check the other hotplug slots on the same bus.

If there are no other adapters connected to the same bus, then from inquiry 220, processing determines whether any hotplug slots have their associated latches open on the same bus 260. If so, no action is taken and processing awaits the next hotplug latch event 280. If no other hotplug latches are open for slots on the same bus, then processing sets the bus speed to, for example, the maximum that all adapters and all slots of the bus support 270. The hotplug slot power is then turned on to connect the adapters to the bus 250, and processing awaits the next hotplug latch event 280.

Advantages

Those skilled in the art will note from the above discussion that provided herein is a hotplug control facility for optimizing hotplugging of multiple adapters into a system having a bus with a plurality of adapter receiving hotplug slots. The facility advantageously makes existing technology easier for a user of the system since the user no longer needs to know speed capabilities of adapters being hot-added to a system. Further, the facility reduces chances of a bus speed mismatch error since the order in which multiple adapters are hotplugged is immaterial. The hot-add sequence of multiple adapters into an empty bus is also no longer an issue since the adapter speed and the slots chosen become irrelevant. The facility presented simplifies the user interface by eliminating the option of asking the user which bus speed is preferred, and creates an automatic way to solve a potentially difficult bus speed user decision. The facility can be added to existing systems without requiring a redesign or reworking of the systems, and can be readily implemented by one skilled in the art.

Alternate Embodiments

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for hotplugging multiple adapters into a system having a bus with a plurality of adapter receiving hotplug slots, said method comprising:

connecting multiple hotplug adapters to multiple hotplug slots of the bus of the system; and responsive to said connecting of multiple hotplug adapters to said multiple hotplug slots, and after determining that all hotplug latches associated with the hotplug slots of the bus are closed, automatically determining a bus speed for the bus that the multiple hotplug slots and the multiple hotplug adapters connected thereto support, wherein said automatically determining is transparent to a user of the system making the hotplug adapter connections and is independent of an order of connection of the multiple hotplug adapters to the multiple hotplug slots.

2. The method of claim 1, wherein said automatically determining occurs subsequent to said connecting and is dependent upon, in part, speed ratings of the multiple hotplug adapters connected to the bus.

3. The method of claim 1, wherein the automatically determining comprises automatically determining an optimal bus speed for the bus having the multiple hotplug adapters connected thereto.

4. The method of claim 1, further comprising opening prior to said connecting multiple hotplug latches associated with the multiple hotplug slots of the bus.

5. The method of claim 4, wherein said connecting comprises connecting the multiple hotplug adapters to the multiple hotplug slots in any order.

6. The method of claim 1, wherein said automatically determining proceeds independent of an order in which the multiple hotplug latches are closed.

7. The method of claim 1, wherein the bus comprises a first bus of the system, and wherein in the system further comprises at least one second bus, and wherein the method is repeatable for the at least one second bus of the system independent of the method applied to the first bus.

8. A method for adapter hotplugging into a system having a bus with multiple adapter receiving hotplug slots, each having an associated hotplug latch, said method comprising:

detecting multiple hotplug latch open events indicative of hotplug addition of multiple adapters to the bus;

determining when all open hotplug latches on the bus are close; and automatically setting a bus speed for the bus that the multiple hotplug slots and adapters connected thereto support after determining that all hotplug latches on the bus are closed.

9. The method of claim 8, further comprising automatically turning power on to the at least one hotplug slot receiving the at least one adapter after setting the bus speed.

10. The method of claim 8, further comprising implementing the automatically setting transparent to a user of the system making the hotplug addition of the at least one adapter to the bus.

11. The method of claim 8, further comprising hotplug adding at least two adapters to the bus, wherein the automatically setting is independent of an order of addition of the at least two adapters to the bus.

12. The method of claim 11, further comprising, prior to said hotplug adding, opening at least two hotplug latches associated with at least two hotplug slots of the bus, and wherein the automatically setting is independent of an order of closing of the at least two hotplug latches.

13. The method of claim 8, wherein the automatically setting of the bus speed comprises automatically setting the bus speed to a maximum that the multiple hotplug slots and adapters connected thereto support.

14. A system for hotplugging multiple adapters into a processing system having a bus with a plurality of adapter receiving hotplug slots, said system comprising:
   means for detecting hotplug receipt of multiple hotplug adapters into multiple hotplug slots of the bus, said multiple hotplug adapters being received into the multiple hotplug slots in any order, irrespective of speed ratings of the multiple hotplug adapters; and
   means for automatically determining a bus speed for the bus that the multiple hotplug slots and the multiple hotplug adapters connected thereto support, wherein the means for automatically determining is responsive to connection of multiple hotplug adapters to said multiple hotplug slots, is after determining that all hotplug latches associated with the hotplug slots of the bus are close, and is transparent to a user of the system making the hotplug adapter connections and independent of an order of connection of the multiple hotplug adapters to the multiple hotplug slots.

15. The system of claim 14, wherein said means for automatically determining is responsive to said means for detecting and is dependent upon, in part, speed ratings of the multiple hotplug adapters connected to the bus.

16. The system of claim 14, wherein the means for automatically determining comprises means for automatically determining an optimal bus speed for the bus having the multiple hotplug adapters connected thereto.

17. The system of claim 14, further comprising latch means associated with the multiple hotplug slots of the bus, said latch means being opened prior to connecting the multiple hotplug adapters into the multiple hotplug slots.

18. The system of claim 14, wherein said means for automatically determining proceeds independent of an order in which the multiple hotplug latches are close.

19. The system of claim 14, wherein the bus comprises a first bus of the processing system, and wherein the system further comprises at least one second bus, and wherein the system is repeatable for the at least one second bus of the processing system independent of the system applied to the first bus.

20. A system for adapter hotplugging into a processing system having a bus with multiple adapter receiving hotplug slots, each having an associated hotplug latch, said system comprising:
   means for detecting multiple hotplug latch open events indicative hotplug addition of multiple adapters to the bus;
   means for determining when all open hotplug latches on the bus are closed; and
   means for automatically setting a bus speed for the bus that the multiple hotplug slots and adapters connected thereto support after determining that all hotplug latches on that bus are closed.

21. The system of claim 20, further comprising means for automatically turning power on to the at least one hotplug slot receiving the at least one adapter after setting the bus speed.

22. The system of claim 20, further comprising means for implementing the means for automatically setting transparent to a user of the system making the hotplug addition of the at least one adapter to the bus.

23. The system of claim 20, further comprising means for hotplug adding at least two adapters to the bus, wherein the means for automatically setting is independent of an order of addition of the at least two adapters to the bus.

24. The system of claim 23, further comprising, prior to said hotplug adding, means for opening at least two hotplug latches associated with at least two hotplug slots of the bus, and wherein the means for automatically setting is independent of an order of closing of the at least two hotplug latches.

25. The system of claim 20, wherein the means for automatically setting of the bus speed comprises means for automatically setting the bus speed to a maximum that the multiple hotplug slots and adapters connected thereto support.

26. At least one program storage device readable by a machine, tangibly embodying at least one program of instructions executable by the machine to perform a method of hotplugging multiple adapters into a system having a bus with a plurality of adapter receiving hotplug slots, the method comprising:
   connecting multiple hotplug adapters to multiple hotplug slots of the bus of the system; and
   responsive to said connecting of multiple hotplug adapters to said multiple hotplug slots, and after determining that all hotplug latches associated with the hotplug slots of the bus are closed, automatically determining a bus speed for the bus that the multiple hotplug slots and the multiple hotplug adapters connected thereto support, wherein said automatically determining is transparent to a user of the system making the hotplug adapter connections and is independent of an order of connection of the multiple hotplug adapters to the multiple hotplug slots.

27. At least one program storage device readable by a machine, tangibly embodying at least one program of instructions executable by the machine to perform a method of adapter hotplugging into a system having a bus with multiple adapter receiving hotplug slots, each having an associated hotplug latch, said method comprising:
   detecting multiple hotplug latch open events indicative of hotplug addition of multiple adapters to the bus;
   determining when all open hotplug latches on the bus are closed; and
   automatically setting a bus speed for the bus that the multiple hotplug slots and adapters connected thereto support after determining that all hotplug latches on the bus are closed.

* * * * *

UNITED STATES PATENT AND TRADEMARK OFFICE
CERTIFICATE OF CORRECTION

PATENT NO. : 6,954,813 B2  
DATED : October 11, 2005  
INVENTOR(S) : Holley, III et al.

It is certified that error appears in the above-identified patent and that said Letters Patent is hereby corrected as shown below:

<u>Column 8,</u>  
Line 37, delete "in" after "wherein".  
Line 47, delete "close;" and insert -- closed; --.

<u>Column 9,</u>  
Line 20, delete "close," and insert -- closed, --.  
Line 38, delete "close." and insert -- closed. --.  
Line 50, insert -- of -- after "indicative".

Signed and Sealed this

Fourth Day of April, 2006

JON W. DUDAS  
*Director of the United States Patent and Trademark Office*